(12) United States Patent
Mohan et al.

(10) Patent No.: US 12,210,104 B2
(45) Date of Patent: Jan. 28, 2025

(54) SYSTEMS AND METHODS TO PROVIDE REAL-TIME CONTEXT-BASED AVOIDANCE MECHANISMS FOR GNSS JAMMING OR SPOOFING REGIONS

(71) Applicant: Honeywell International Inc., Charlotte, NC (US)

(72) Inventors: Rajeev Mohan, Bangalore (IN); Vijay Kumar Shrimal, Bangalore (IN); Mohan Singh Tomar, Bangalore (IN); Douglas Mark Weed, Forest Lake, MN (US); Ryan N Supino, Loretto, MN (US)

(73) Assignee: Honeywell International Inc., Charlotte, NC (US)

( * ) Notice: Subject to any disclaimer, the term of this patent is extended or adjusted under 35 U.S.C. 154(b) by 304 days.

(21) Appl. No.: 17/685,208

(22) Filed: Mar. 2, 2022

(65) Prior Publication Data
US 2023/0280472 A1    Sep. 7, 2023

(51) Int. Cl.
*G01S 19/00* (2010.01)
*G01S 19/01* (2010.01)
(Continued)

(52) U.S. Cl.
CPC .......... *G01S 19/215* (2013.01); *G01S 19/015* (2013.01); *G08G 5/0004* (2013.01); *G08G 5/0039* (2013.01)

(58) Field of Classification Search
None
See application file for complete search history.

(56) References Cited

U.S. PATENT DOCUMENTS 5,557,284 A    9/1996    Hartman
5,952,968 A    9/1999    McDowell
(Continued)

FOREIGN PATENT DOCUMENTS

EP    3671253 A1    6/2020
GB    2521246 A    6/2015
(Continued)

OTHER PUBLICATIONS

BBC, "Study maps 'extensive Russian GPS spoofing'", Apr. 2, 2019, pp. 1 through 7, https://www.bbc.com/news/technology-47786248.
(Continued)

*Primary Examiner* — James M McPherson
(74) *Attorney, Agent, or Firm* — Fogg & Powers LLC (57) ABSTRACT

Techniques are disclosed for providing at least one proposed alternative plan of travel of a vehicle are disclosed based upon data of at least one geographic region about at least one of global navigation satellite system (GNSS) spoofing and GNSS jamming. If a current path of travel of the vehicle intersects at least one geographic region of at least one of GNSS spoofing and GNSS jamming, then determining the at least one proposed alternative plan of travel of the vehicle. At least one of the at least one proposed alternative plan of travel includes a path of travel that does not intersect at least one geographic region of the at least one geographic region of at least one of GNSS spoofing and GNSS jamming. The determined at least one proposed alternative plan of travel is sent to the vehicle.

15 Claims, 6 Drawing Sheets

(51) Int. Cl.
*G01S 19/21* (2010.01)
*G08G 5/00* (2006.01)

(56) References Cited

U.S. PATENT DOCUMENTS

| | | | |
|---|---|---|---|
| 6,933,885 | B1 | 8/2005 | Stockmaster et al. |
| 7,221,312 | B2 | 5/2007 | Yee et al. |
| 7,250,903 | B1 | 7/2007 | McDowell |
| 7,783,246 | B2 | 8/2010 | Twitchell, Jr. et al. |
| 7,952,519 | B1 | 5/2011 | Nielsen et al. |
| 9,466,881 | B1 | 10/2016 | Berry et al. |
| 9,528,834 | B2 | 12/2016 | Breed et al. |
| 9,689,686 | B1 | 6/2017 | Carmack et al. |
| 9,847,033 | B1 | 12/2017 | Carmack et al. |
| 9,849,978 | B1* | 12/2017 | Carmack ............... G01S 19/215 |
| 10,024,973 | B1 | 7/2018 | Alexander et al. |
| 10,073,179 | B2 | 9/2018 | Driscoll et al. |
| 10,466,700 | B1* | 11/2019 | Carmack ............... G08G 5/0069 |
| 10,725,182 | B2 | 7/2020 | Boyer et al. |
| 10,746,880 | B2 | 8/2020 | Ben-Moshe et al. |
| 10,948,602 | B1 | 3/2021 | Alexander et al. |
| 11,194,052 | B1* | 12/2021 | Kazmierczak ........ G01S 19/215 |
| 2004/0203461 | A1 | 10/2004 | Hay |
| 2006/0234641 | A1 | 10/2006 | LaGrotta |
| 2015/0116145 | A1 | 4/2015 | Ashjaee |
| 2015/0123846 | A1 | 5/2015 | Jeong et al. |
| 2016/0253907 | A1* | 9/2016 | Taveira .................. G05D 1/102 701/3 |
| 2018/0068567 | A1* | 3/2018 | Gong ..................... G05D 1/106 |
| 2018/0165971 | A1* | 6/2018 | Chen ..................... G08G 5/0039 |
| 2019/0033463 | A1 | 1/2019 | Ben-Moshe et al. |
| 2020/0225048 | A1 | 7/2020 | Schwindt |
| 2020/0371246 | A1* | 11/2020 | Marmet ................ G01S 5/0009 |
| 2021/0384994 | A1 | 12/2021 | Borges et al. |
| 2022/0018972 | A1* | 1/2022 | Bennington ........... G05D 1/101 |
| 2022/0066044 | A1 | 3/2022 | McDonald et al. |

FOREIGN PATENT DOCUMENTS

| | | |
|---|---|---|
| GB | 2585221 A | 1/2021 |
| WO | 2013177181 A2 | 11/2013 |
| WO | 2020240571 A1 | 12/2020 |

OTHER PUBLICATIONS

Tranchet, "ED-259—Jamming detection", Presented in One Hundred and Seventh Meeting, Special Committee 159 (SC-159), Navigation Equipment Using the Global Navigation Satellite System (GNSS) and Fifty-Second Meeting Eurocae Working Group 62 (WG-62), Galileo, May 13, 2020, pp. 1 through 7, Airbus.

European Patent Office, "Extended European Search Report from EP Application No. 21190914.8" from Foreign Counterpart to U.S. Appl. No. 17/177,437, May 24, 2022, pp. 1 through 9, Published: EP.

European Patent Office, "Communication pursuant to Article 94(3)", dated Feb. 29, 2024, from EP Application No. 21190914.7, from Foreign Counterpart to U.S. Appl. No. 17/177,437, pp. 1 through 7, Published: EP.

European Patent Office, "Extended European Search Report", from EP Application No. 23156338.8, from Foreign Counterpart to U.S. Appl. No. 17/685,208, Jul. 5, 2023, pp. 1 through 8, Published: EP.

Kong, Peng-Yong, "A Survey of Cyberattack Countermeasures for Unmanned Aerial Vehicles", IEEE Access, IEEE, USA, vol. 9, Nov. 2, 2021, XP011887453, pp. 148244 through 148263.

Airbus, "GNSS loss and GNSS Interferences on Airbus A/C", In-Service Information, Feb. 22, 2019, pp. 1 through 15, (c) Airbus SAS, 2019.

Grace, et al., "An Automated Tool for Mission Planning in GPS-Denied Areas", Report sponsored by the U.S. Navy, Space and Naval Warfare Systems Center in San Diego under the Navy's Small Business Innovation Research Program, Performing Organization: Toyon Research Corporation, Coleta, CA, pp. 1 through 6, Report Date: 2006.

Harris, "FAA Files Reveal a Surprising Threat to Airline Safety: The U.S. Military's GPS Tests", IEEE Spectrum, pp. 1 through 24, as downloaded on Sep. 2, 2021 from: https://spectrum.ieee.org/faa-files-reveal-a-surprising-threat-to-airline-safety-the-us-military-gps-tests.

The Editorial Team, "Understanding GPS spoofing in shipping: How to stay protected", Connectivity, Cyber Security, Jan. 31, 2020, as downloaded on Sep. 2, 2021 from https://safety4sea.com/cm-undertanding-gps-spoofing-in-shipping-how-to-stay-protected/?_cf_chl_jschl_tk _=pmd_01LryD_KGvK4u2F18xAFwse8 . . . , pp. 1 through 10.

McDonald et al., "Systems and Methods for Collecting, Processing and Providing Geographic Information About Interference With a Global Navigation Satellite System", U.S. Appl. No. 17/177,437, filed Feb. 17, 2021, pp. 1 through 29.

U.S. Patent and Trademark Office, "Office Action", U.S. Appl. No. 17/177,437, Sep. 19, 2022, pp. 1 through 36, Published: US.

U.S. Patent and Trademark Office, "Final Office Action", U.S. Appl. No. 17/177,437, Feb. 16, 2023, pp. 1 through 22, Published: US.

* cited by examiner

SYSTEMS AND METHODS TO PROVIDE REAL-TIME CONTEXT-BASED AVOIDANCE MECHANISMS FOR GNSS JAMMING OR SPOOFING REGIONS

BACKGROUND

Global Navigation Satellite Systems (GNSS) serve an important role in vehicle navigation. Vehicles rely on GNSS-based navigation solutions for a wide variety of applications, including route and mission planning, vehicle tracking, and transportation management. GNSS can provide a highly accurate and reliable navigation solution while traversing to a destination.

However, GNSS data is susceptible to a wide variety of external factors that can undermine the integrity of the calculated navigation solution. For example, landscape, weather conditions, receiver quality, satellite position and health, and hardware/software faults can all adversely impact GNSS-solution integrity. GNSS integrity can be further impacted by intentional alteration of GNSS signals, such as by GNSS jamming or GNSS spoofing. Manipulating GNSS signals causes devastating results for unwary operators because manipulation occurs without any warning and, in the case of GNSS spoofing, deceives the actual position of the vehicle to the operator, who oftentimes cannot rely on environmental cues to identify the misrepresentation. Hence, intentional interference can not only be difficult to detect but even more difficult to correct. GNSS jamming and spoofing at best causes disruptions to expected mission times, as a result, increases costs and decreases efficiency. At worst, GNSS jamming and spoofing poses a severe threat to human life for the unprepared navigator.

Many solutions exist for detecting GNSS jamming and spoofing. These solutions reactively inform operators and crew of likely GNSS jamming or spoofing occurrences and may also provide alternative navigation solutions if such solutions are available. Yet, with GNSS jamming and spoofing occurrences becoming increasingly common, more proactive, dynamic means are needed to best protect operators and/or the goods in transport.

SUMMARY

In one embodiment, a method of providing at least one proposed alternative plan of travel of a vehicle is disclosed. The method comprises, based upon data of at least one geographic region about at least one of global navigation satellite system (GNSS) spoofing and GNSS jamming, determining if a current path of travel of the vehicle intersects at least one geographic region of at least one of GNSS spoofing and GNSS jamming. The method further comprises determining that the current path of travel of the vehicle intersects at least one geographic region of at least one of GNSS spoofing and GNSS jamming, then determining the at least one proposed alternative plan of travel of the vehicle. At least one of the at least one proposed alternative plan of travel includes a path of travel that does not intersect at least one geographic region of the at least one geographic region of at least one of GNSS spoofing and GNSS jamming. The method further comprises sending, to the vehicle, the determined at least one proposed alternative plan of travel of the vehicle.

In another embodiment, a program product is disclosed. The program product comprises a non-transitory processor-readable medium on which program instructions, configured to be executed by at least one processor, are embodied. The program instructions are operable to, based upon data of at least one geographic region about at least one of global navigation satellite system (GNSS) spoofing and GNSS jamming, determine if a current path of travel of a vehicle intersects at least one geographic region of at least one of GNSS spoofing and GNSS jamming. The program instructions are further operable to determine that the current path of travel of the vehicle intersects at least one geographic region of at least one of GNSS spoofing and GNSS jamming, then determine at least one proposed alternative plan of travel of the vehicle. At least one of the at least one proposed alternative plan of travel includes a path of travel that does not intersect at least one geographic region of the at least one geographic region of at least one of GNSS spoofing and GNSS jamming. The program instructions are further operable to send, to the vehicle, the determined at least one proposed alternative plan of travel of the vehicle.

In yet another embodiment, a system is disclosed. The system comprises a Global Navigation Satellite System (GNSS) receiver configured to determine a position of a vehicle in a geographic region. The system further comprises processor circuitry coupled to the GNSS receiver. The processor circuitry is configured to determine whether the position of the vehicle determined by the GNSS receiver is caused by at least one of GNSS spoofing and GNSS jamming. The processor circuitry is further configured to, upon determining that the position of the vehicle determined by the GNSS receiver is caused by at least one of GNSS spoofing and GNSS jamming, then determine at least one proposed alternative plan of travel of the vehicle. At least one of the at least one proposed alternative plan of travel includes a plan of travel that does not intersect at least one geographic region of the at least one geographic region of at least one of GNSS spoofing and GNSS jamming.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
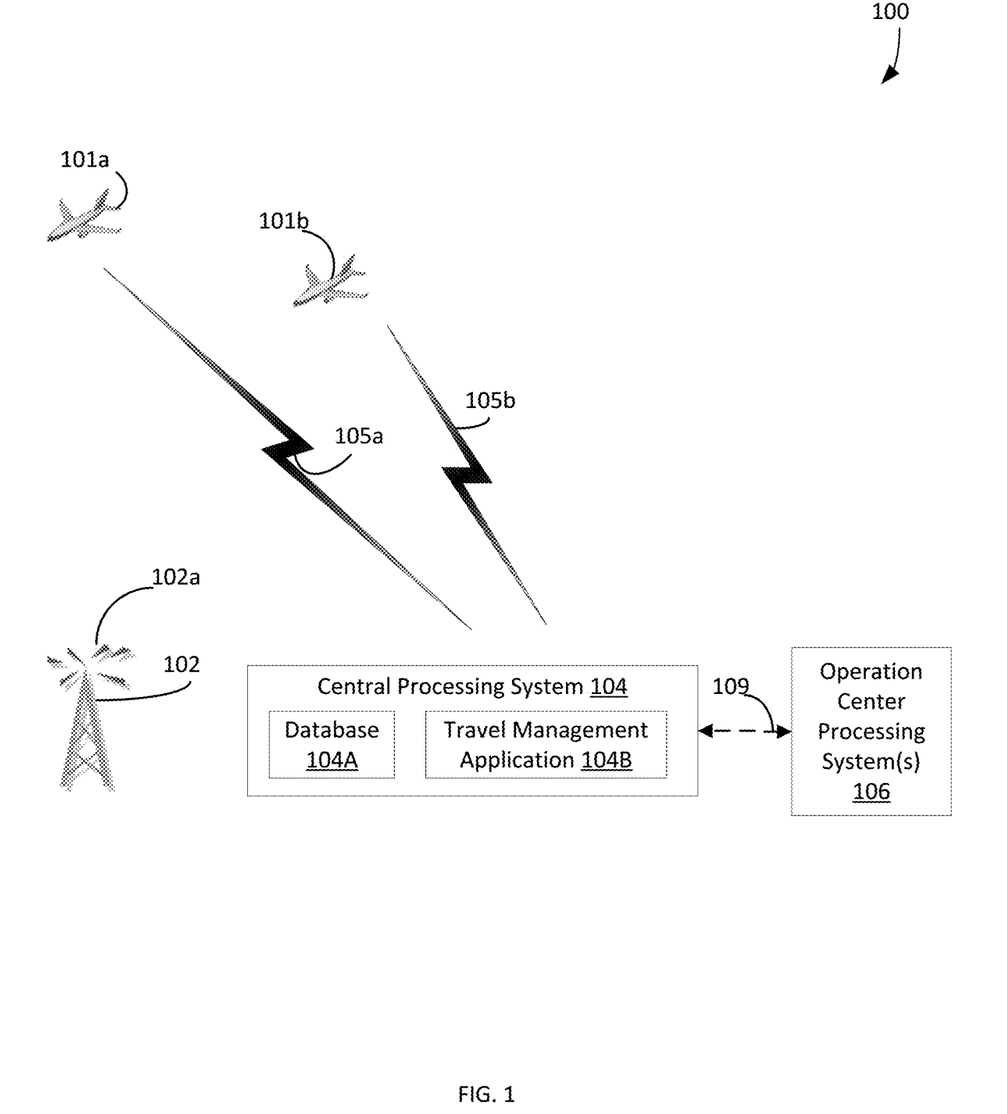
FIG. 1 depicts a diagram illustrating an exemplary central processing system configured to communicate GNSS jamming and/or spoofing information to vehicles in a communication network.

FIG. 1 depicts a diagram illustrating an exemplary central processing system configured to communicate GNSS jamming or spoofing information to vehicles in a communication network 100. The central processing system 104 includes a database 104A and a travel management application 104B. The database 104A and/or the travel management application 104B can be stored in memory circuitry. Central processing system 104 may include processing circuitry comprising any one or combination of processors, microprocessors, digital signal processors, application specific integrated circuits, field programmable gate arrays, and/or other similar variants thereof. Central processing system 104 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures. For example, central processing system 104 is configured to execute the instructions of travel management application 104B to determine and provide at least one alternative proposed plan of travel of a vehicle, as described in the embodiments of FIGS. 4-5.

Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles). Throughout the disclosure, the vehicle may be further illustrated as an aircraft with the understanding that the principles described herein apply to other vehicles where applicable.

Still referring to FIG. 1, central processing system 104 is configured to communicate with one or more vehicles in the communication network 100, including vehicles 101a and 101b, over a respective communication link 105a, 105b. Communication links 105a, 105b can be any form of wireless communication, including but not limiting to, high frequency (HF), very high frequency (VHF), satellite communications (SATCOM), datalink, and the like.

Vehicles 101a, 101b are configured to communicate data to central processing system 104 including data corresponding to GNSS spoofing and/or jamming. For example, when vehicles 101a and/or 101b enter a geographic region associated with GNSS spoofing and/or jamming, such as from an external GNSS spoofing and/or jamming source 102 transmitting a spoofing and/or jamming signal 102a, the vehicles gather data describing the GNSS spoofing and/or jamming occurrence and send the data to central processing system 104. Vehicles 101a and/or 101b can also be equipped with GNSS spoofing and/or jamming detection systems (e.g., using conventional GNSS spoofing and/or jamming techniques) to determine when GNSS data for each vehicle 101a, 101b is being spoofed or jammed. Vehicles 101a, 101b continue to send data about at least one geographic region associated with GNSS spoofing and/or jamming until the respective vehicle exits the spoofed/jammed geographic area (e.g., it no longer detects GNSS spoofing and/or jamming).

Central processing system 104 is also configured to receive GNSS spoofing and/or jamming data simultaneously from any vehicles experiencing GNSS spoofing/jamming in communication network 100. In some embodiments, central processing system 104 is configured to store the acquired GNSS spoofing and/or jamming data in database 104A, including one or more zones in a geographical area where GNSS spoofing and/or jamming is currently present. In some embodiments, database 104A is configured to store known GNSS spoofing and/or jamming data acquired a priori for future use in determining an alternative plan of travel. Database 104A can also be periodically updated as more recent data becomes available. After central processing system 104 receives GNSS spoofing and/or jamming data, it then determines a proposed alternative plan of travel for the impacted vehicles based on the received data and optionally, the known GNSS spoofing/jamming data stored in database 104A. Optionally, vehicles 101a and/or 101b sends a request to central processing system 104 for a proposed alternative travel plan.

Central processing system is configured to send the proposed alternative plan of travel to vehicles 101a, 101b. When the vehicles 101a, 101b receive the proposed alternative plan of travel, they can change the current path of travel based on the proposed alternative plan of travel. In some embodiments, vehicle 101a, 101b sends a message to operation center processing system 106 (e.g., an air traffic control center) with the proposed alternative plan of travel for approval. Optionally, central processing system 104 is communicatively coupled to operation center processing system 106 via communication link 109. In these embodiments, central processing system 104 sends updated data about at least one geographic region associated with GNSS spoofing and/or jamming to operation center processing system 106. Additionally, or alternatively, central processing system 104 is configured to send the at least one proposed alternative plan of travel for a vehicle 101a, 101b to operation center processing system 106. This enables operation center processing system 106 to be aware of the proposed alternative plan of travel if vehicle 101a, 101b is unable to broadcast a proposed change while in the geographic region associated with GNSS spoofing/jamming. Exemplary techniques for determining and providing at least one plan of travel are further described in FIGS. 2-6.

Figure 2:
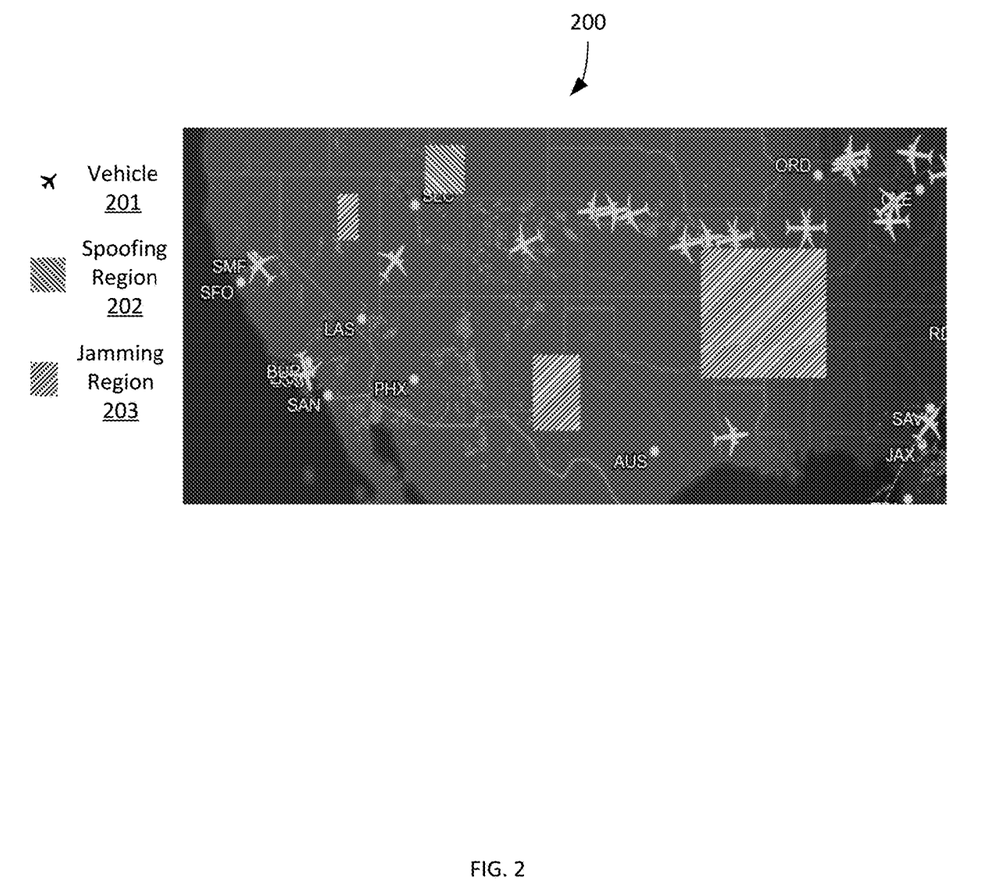
FIG. 2 depicts a graphical representation on a display device that visualizes known GNSS jamming and/or spoofing regions in a geographical area.

FIG. 2 depicts a graphical representation 200 visualizing known GNSS jamming or spoofing regions in a geographical area. Graphical representation 200 can be implemented on a display and/or human-machine interface on a display device. In some embodiments, the display device is an avionics device such as a flight management computer, electronic flight bag, or other avionics device. Graphical representation 200 also visualizes data stored in database 104A. For example, graphical representation 200 can be implemented as a map that includes data on one or more geographic regions associated with GNSS spoofing 202, as well as one or more geographic regions associated with GNSS jamming 203. In some embodiments, graphical representation 200 displays the location of vehicles 201 in the communication network as described in FIG. 1, including vehicles 101a, 101b, and optionally, the current path of travel corresponding to the vehicles. Other information may also be displayed on graphical representation 200, such as major cities, airports, and other navigation data. However, graphical representation 200 can be visualized in other ways as well.

When at least one proposed alternative plan of travel is determined (by a travel management application executed on a vehicle 201 or a central processing system, for example), the alternative plan(s) of travel is received by at least one avionics device on a vehicle 101a, 101b and/or operation center processing system 106 and graphically displayed in one embodiment as graphical representation 200. An operator or crew member of the vehicle 201 can select one of the at least one proposed alternative plans of travel via a human-machine interface on the avionics device. When a selection is received by the central processing system 104 (a processing system on a vehicle), the processing system is configured to change the current path of travel of the vehicle 201 to the selected proposed alternative plan of travel of the vehicle 201.

Figure 3:
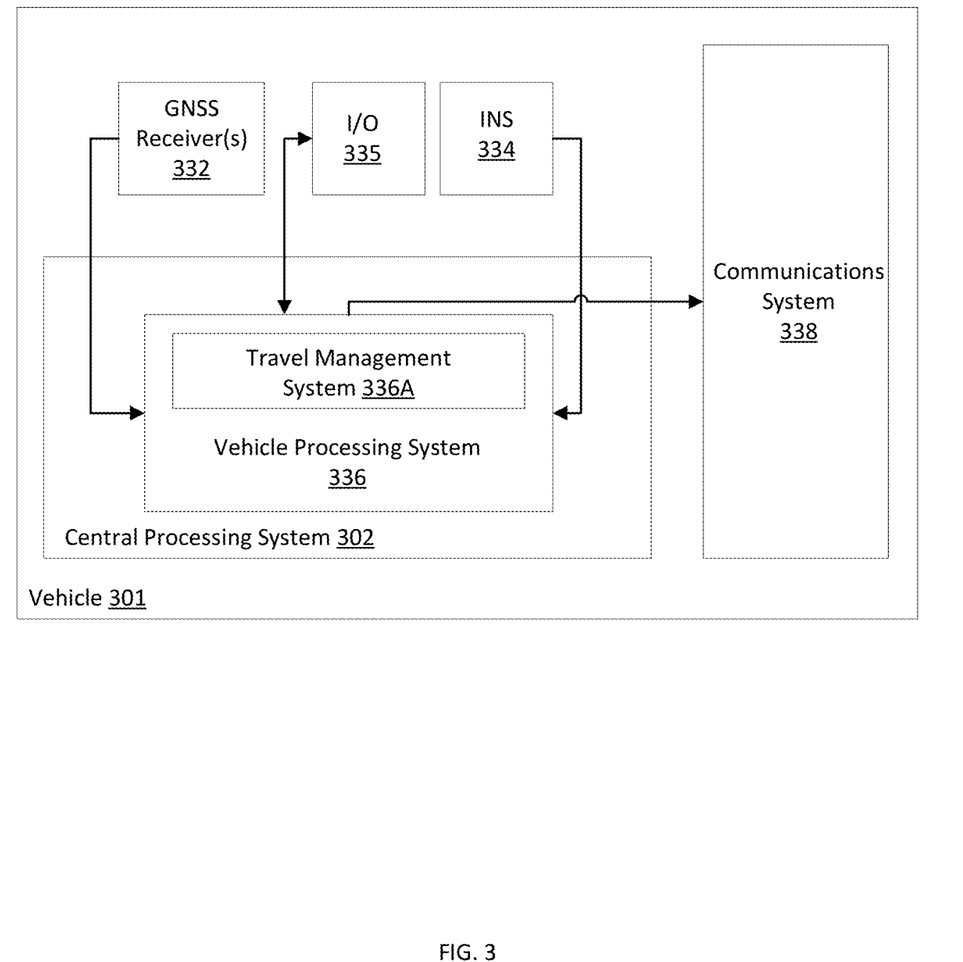
FIG. 3 depicts a block diagram illustrating an exemplary system configured to provide an alternative plan for travel based on known GNSS jamming and/or spoofing data.

FIG. 3 depicts a block diagram illustrating an exemplary system configured to determine a proposed alternative plan for travel based on known GNSS jamming or spoofing data. The system includes a vehicle processing system 336 and a communications system 338 on a vehicle 301. Vehicle processing system 336 is coupled to one or more GNSS receivers 332, input/output (I/O) 335, and inertial navigation system 334 and configured to receive data from each. GNSS receiver 332 is configured to receive pseudo-range and ephemeris data from a plurality of satellites in a GNSS constellation. GNSS receiver 332 is also configured to determine a three-dimensional position based on the received pseudo-range data. Some example GNSS systems include the Global Positioning System (GPS), Galileo, Beidou, and Globalnaya Navigazionnaya Sputnikovaya Sistema (GLONASS).

I/O 335 includes one or more input and output ports configured to couple central processing system 302 to other systems and circuitry on vehicle 301, including display(s) such as touch screen display(s), keyboard(s), and switch(es). In some embodiments, I/O 335 transmits data from the vehicle crew to vehicle processing system 336 and provides data from vehicle processing system 336 to the vehicle crew.

INS 334 is configured to determine one or more navigation parameters for the vehicle 301 based on received navigation measurements from one or more sensors on the vehicle. In some embodiments, vehicle 301 is configured to determine a vehicle position from INS 334 or an alternative positioning system when vehicle 301 receives spoofed and/or jammed GNSS data from GNSS receiver 332. INS 334 includes one or more gyroscopes, one or more accelerometers, and/or one or more magnetometers. In some embodiments, INS 334 is implemented as one or more inertial measurement units (IMU).

Vehicle processing system 336 also includes travel management system 336A configured to determine and provide at least one alternative plan of travel for vehicle 301. Vehicle processing system 336 is configured to send the at least one proposed alternative plan of travel to the vehicle operator and/or crew members via I/O 335, and to receive a selection of a proposed alternative travel plan from the vehicle operator and/or crew members. Vehicle processing system 336 is then configured to send the selected proposed alternative travel plan to communications system (e.g., a communications management unit (CMU)) so that the selected proposed alternative travel plan can be sent to an operation center processing system.

Figure 4:
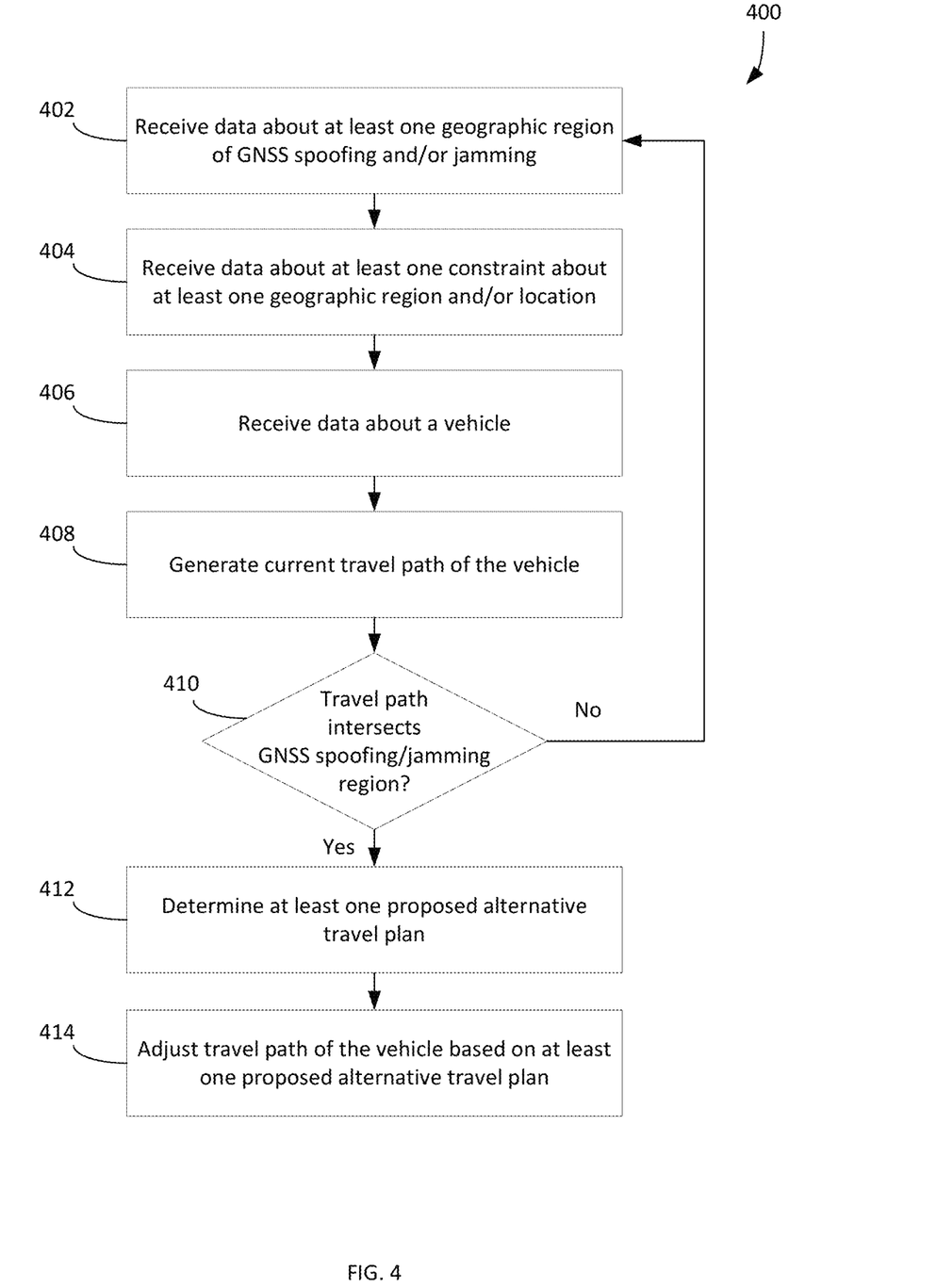
FIG. 4 depicts a flow diagram illustrating an exemplary method for providing at least one proposed alternative plan of travel of a vehicle.

FIG. 4 depicts a flow diagram illustrating an exemplary method for providing at least one alternative proposed plan of travel of a vehicle. Method 400 may be implemented via the techniques described with respect to FIGS. 1-3, but may be implemented via other techniques as well. Optionally, method 400 is implemented by travel management application 104B of central processing system 104 and/or by travel management system 336A of vehicle processing system 336. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Beginning at block 402, receive data about at least one geographic region of GNSS spoofing and/or jamming. In some embodiments, data is received from a central processing system in communication with other vehicles and/or ground stations in a wireless communications network. Received data includes data identifying GNSS spoofing and/or GNSS jamming from sensors on at least one vehicle in the network. Data can also include information such as the timing and duration of the occurrence, the location of the vehicle, and other GNSS data.

Proceeding to block 404, receive data about at least one constraint about at least one geographic region and/or location. The at least one constraint can include information such as weather information, information about other vehicles in the geographic region, and any travel restrictions in the geographic region. Such travel restrictions can include areas to avoid traveling in the geographic region from a notice to airmen (NOTAM) application, landing sites to avoid, and other travel restrictions imposed by regulatory authorities (e.g., the Federal Aviation Administration (FAA)).

Proceeding to block 406, receive data about a vehicle. Data about the vehicle can include equipment lists on the vehicle, fuel level, current vehicle state variables, and information on the existing travel plan for the vehicle such as the destination, desired arrival time, and navigation parameters of the vehicle. Data can be acquired from sensors, sensor systems, or communication systems onboard the vehicle.

Proceeding to block 408, generate current travel path of the vehicle. Travel path as used herein means a continuous or discrete path of travel from a start point of the vehicle to a destination point and/or through one or more waypoint. A travel path can also include information such as the arrival time to a destination and/or waypoint, and the source of data for navigating the vehicle during travel.

At block 410, determine if the current travel path intersects at least one region of GNSS jamming and/or spoofing. If the current travel path does not intersect at least one region of GNSS jamming and/or spoofing, then the current travel path does not need to be altered and the vehicle can continue to traverse according to the current travel path. In this case, revert back to block 402 and continue along the current travel path until data is received that indicates that the current travel path intersects with at least one geographic region associated with known GNSS jamming or spoofing occurrences.

If the current travel path intersects with at least one region of GNSS jamming or spoofing, then at block 412, determine at least one proposed alternative travel plan which avoids the use of GNSS data in the intersecting at least one geographic region of GNSS jamming or spoofing. A proposed alternative travel plan includes a destination, a current location of the vehicle, and may include one or more waypoints in between the current location of the vehicle and the destination. At least one of the proposed alternative travel plans affects the travel path or changes the source of vehicle state variable data used by the travel management system of the vehicle. In some embodiments, the proposed alternative travel plan includes a travel path that avoids traversing through areas of known GNSS jamming or spoofing disturbances while also avoiding other constraint variables like intersecting vehicles, inclement weather, and other restricted regions. One exemplary embodiment of determining at least one proposed alternative travel plan is described with respect to FIG. 5.

Proceeding to block 414, adjust a travel path of the vehicle based on the at least one proposed alternative travel plan. In some embodiments, two or more proposed alternative travel plans are presented to the vehicle for selection by the vehicle crew and/or operators. Upon receiving the selection from the vehicle, the selected proposed alternative travel plan is used to determine the adjusted travel path of the vehicle. The adjusted travel path can be used as the current travel path until the travel path needs to be adjusted again based on new GNSS jamming or spoofing data.

Figure 5:
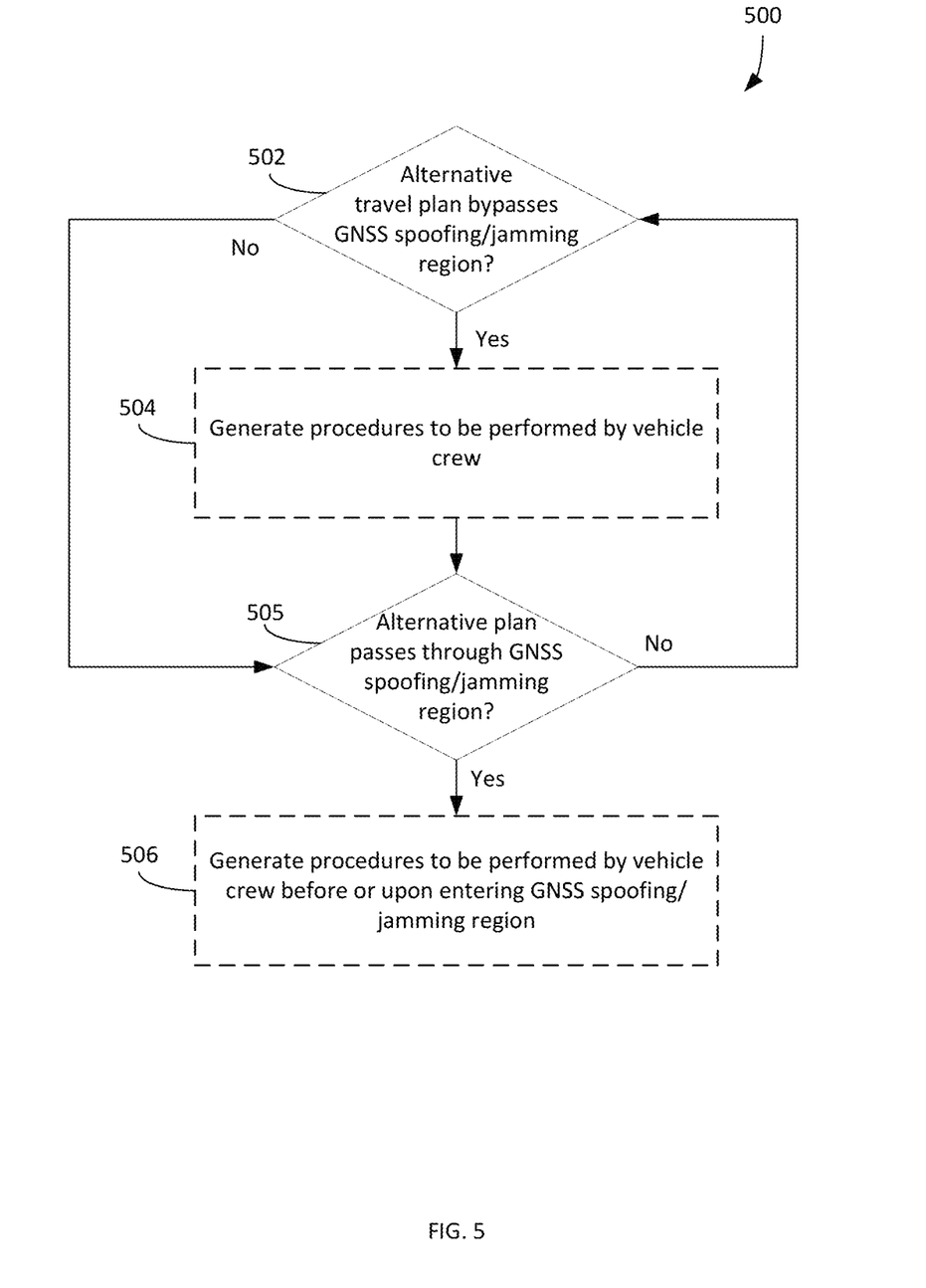
FIG. 5 depicts a flow diagram illustrating an exemplary method for determining at least one proposed alternative plan of travel of a vehicle that avoids a known geographical area of GNSS jamming or spoofing.

FIG. 5 depicts a flow diagram illustrating an exemplary method 500 for determining at least one proposed alternative travel plan for a vehicle that avoids use of GNSS data in at least one geographical region associated with GNSS jamming or spoofing. In one embodiment, the method is performed as part of block 412 and performed for each proposed alternative travel plan. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Beginning at block 502, determine, for the proposed alternative travel plan, whether the vehicle bypasses at least one geographical region that is associated with GNSS jamming and/or spoofing in the original (e.g., current) travel path. If the vehicle bypasses the GNSS jamming and/or spoofing regions present in the original travel path, then optionally proceed to block 504 and generate procedures to be performed by vehicle crew. In one embodiment, the generated procedures can include notifying one or more recipients of the alternative travel plan (e.g., a ground station or aircraft operations center) so that the recipient can be aware of the change in travel path and any delays that result from bypassing the GNSS interference regions.

If the proposed alternative travel plan does not bypass at least one GNSS interference region (or alternatively, after generating procedures to be performed by the vehicle crew at block 504), method 500 proceeds to block 505 and determines whether the proposed alternative travel plan passes through at least one GNSS interference region. If the alternative travel plan does pass through a GNSS spoofing/jamming region, then at block 506, optionally generate procedures to be performed by the vehicle crew before or upon entering each of the at least one GNSS interference region. In one embodiment, generating procedures includes switching to non-GNSS source of state variables of the vehicle for use in navigations. Additionally or alternatively, data acquired by one or more GNSS receivers on the vehicle is ignored.

Figure 6:
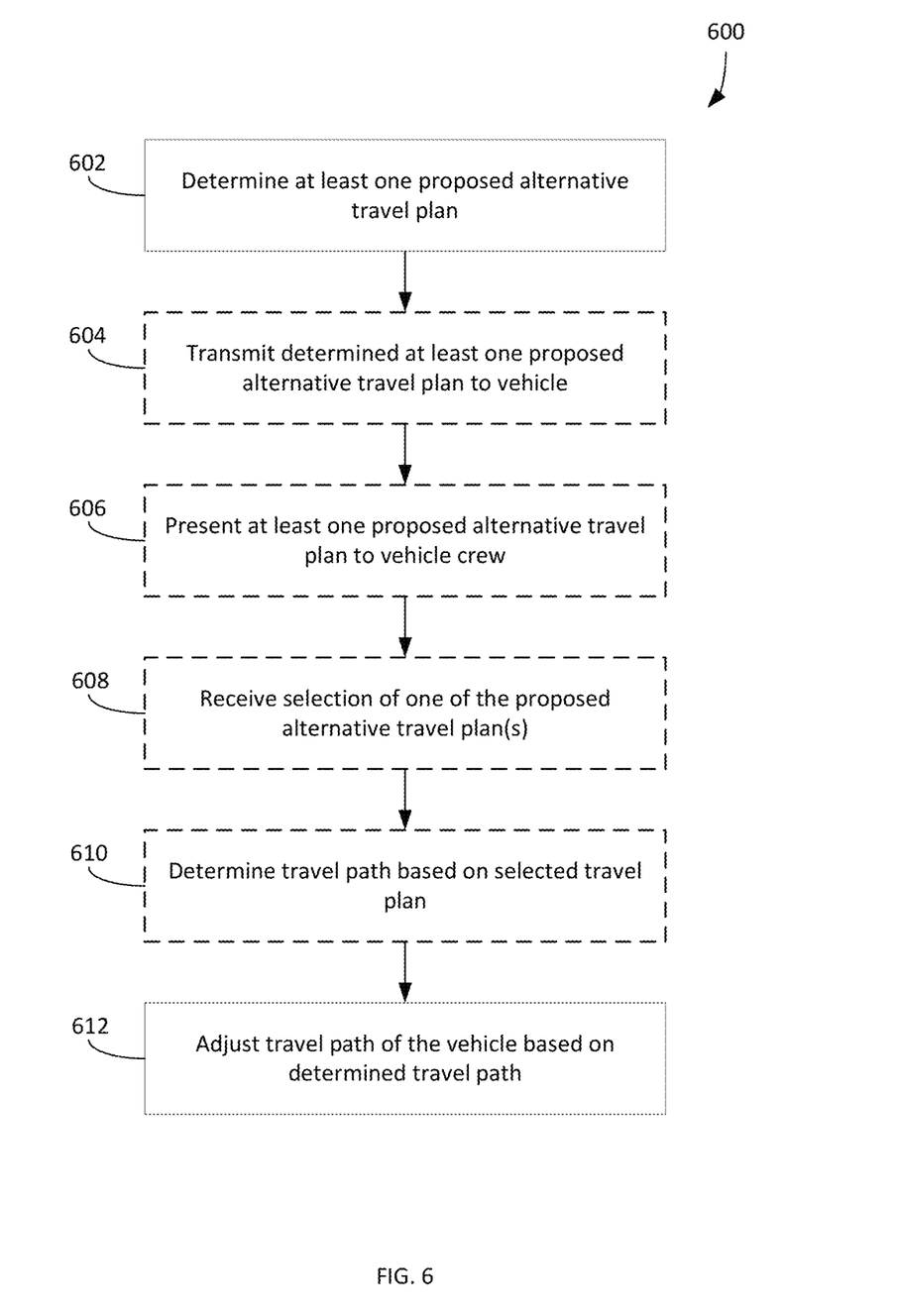
FIG. 6 depicts a flow diagram illustrating an exemplary method for determining a path of travel based on at least one proposed alternative plan of travel.

FIG. 6 depicts a flow diagram illustrating an exemplary method for determining a path of travel based on at least one proposed plan of travel. In one embodiment, method 600 is performed between blocks 412 and 414 of method 400. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Starting at block 602, determine at least one proposed alternative travel plan for a vehicle, as described above with respect to FIGS. 1-5. Method 600 optionally proceeds to block 604 to transmit the determined at least one proposed alternative travel plan to the vehicle. At optional block 606, present the at least one proposed alternative travel plan to vehicle crew. Then, optionally receive a selection of one of the proposed alternative plans of travel from the vehicle crew at block 608. At optional block 610, determine the travel path of the vehicle based on the selected plan of travel from the vehicle crew. Method 600 then proceeds to block 612 to adjust the current travel path of the vehicle based on the determined travel path from the selected plan of travel.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application specific integrated circuits (ASICs).

EXAMPLE EMBODIMENTS

Example 1 includes a method of providing at least one proposed alternative plan of travel of a vehicle, the method comprising: based upon data of at least one geographic region about at least one of global navigation satellite system (GNSS) spoofing and GNSS jamming, determining if a current path of travel of the vehicle intersects at least one geographic region of at least one of GNSS spoofing and GNSS jamming; determining that the current path of travel of the vehicle intersects at least one geographic region of at least one of GNSS spoofing and GNSS jamming, then determining the at least one proposed alternative plan of travel of the vehicle, wherein at least one of the at least one proposed alternative plan of travel includes a path of travel that does not intersect at least one geographic region of the at least one geographic region of at least one of GNSS spoofing and GNSS jamming; and sending, to the vehicle, the determined at least one proposed alternative plan of travel of the vehicle.

Example 2 includes the method of Example 1, further comprising: presenting, to the crew of the vehicle, the at least one proposed alternative plan of travel of the vehicle; receiving, from the crew, a selection of one of the at least one proposed alternative plan of travel of the vehicle; determining a path of travel based on the selection of one of the at least one proposed alternative plan of travel; and changing the current path of travel of the vehicle to the determined path of travel of the vehicle.

Example 3 includes the method of any of Examples 1-2, further comprising sending the determined at least one proposed alternative plan of travel of the vehicle to at least one operation center processing system.

Example 4 includes the method of any of Examples 1-3, wherein determining if a current path of travel of the vehicle intersects at least one geographic region of at least one of GNSS spoofing and GNSS jamming comprises accessing data stored in a database, the database including data on at least one geographic region of at least one of GNSS spoofing and GNSS jamming.

Example 5 includes the method of any of Examples 1-4, wherein at least one of the at least one proposed alternative plan of travel includes a path of travel that does not intersect any geographic region of the at least one geographic region of at least one of GNSS spoofing and GNSS jamming.

Example 6 includes the method of any of Examples 1-5, wherein determining at least one proposed alternative plan of travel further comprises: determining that the vehicle bypasses at least one geographic region of at least one of GNSS spoofing and GNSS jamming in the current path of travel of the vehicle; and sending a message to at least one operation center processing system including a delay associated with the at least one proposed alternative plan of travel.

Example 7 includes the method of any of Examples 1-6, wherein determining at least one proposed alternative plan of travel further comprises: determining that the vehicle passes through at least one geographic region of at least one of GNSS spoofing and GNSS jamming in the current path of travel of the vehicle; and switching to one or more position determining systems upon entering each of the at least one geographic region of at least one of GNSS spoofing and GNSS jamming associated with the at least one proposed alternative plan of travel.

Example 8 includes the method of any of Examples 1-7, further comprising: receiving data about at least one constraint about at least one geographic region and/or location; receiving one or more navigation parameters of the vehicle; and generating a current travel path of the vehicle based on the at least one constraint, the one or more navigation parameters of the vehicle; and the data of at least one geographic region of at least one of GNSS spoofing and GNSS jamming.

Example 9 includes a program product comprising a non-transitory processor-readable medium on which program instructions, configured to be executed by at least one processor, are embodied, wherein the program instructions are operable to: based upon data of at least one geographic region about at least one of global navigation satellite system (GNSS) spoofing and GNSS jamming, determine if a current path of travel of a vehicle intersects at least one geographic region of at least one of GNSS spoofing and GNSS jamming; determining that the current path of travel of the vehicle intersects at least one geographic region of at least one of GNSS spoofing and GNSS jamming, then determine at least one proposed alternative plan of travel of the vehicle, wherein at least one of the at least one proposed alternative plan of travel includes a path of travel that does not intersect at least one geographic region of the at least one geographic region of at least one of GNSS spoofing and GNSS jamming; and send, to the vehicle, the determined at least one proposed alternative plan of travel of the vehicle.

Example 10 includes the program product of Example 9, wherein the program instructions further cause the at least one processor to: present, to the crew of the vehicle, the at least one proposed alternative plan of travel of the vehicle; receive, from the crew, a selection of one of the at least one proposed alternative plan of travel of the vehicle; determine a path of travel based on the selection of one of the at least one proposed alternative plan of travel; and change the current path of travel of the vehicle to the determined path of travel of the vehicle.

Example 11 includes the program product of any of Examples 9-10, wherein the program instructions further cause the at least one processor to send the determined at least one proposed alternative plan of travel of the vehicle to at least one operation center processing system.

Example 12 includes the program product of any of Examples 9-11, wherein determine if a current path of travel of the vehicle intersects at least one geographic region of at least one of GNSS spoofing and GNSS jamming comprises accessing data stored in a database, the database including data on at least one geographic region of at least one of GNSS spoofing and GNSS jamming.

Example 13 includes the program product of any of Examples 9-12, wherein at least one of the at least one proposed alternative plan of travel includes a path of travel that does not intersect any geographic region of the at least one geographic region of at least one of GNSS spoofing and GNSS jamming.

Example 14 includes the program product of any of Examples 9-13, wherein the program instructions further cause the at least one processor to: determine that the vehicle bypasses at least one geographic region of at least one of GNSS spoofing and GNSS jamming in the current path of travel of the vehicle; and send a message to at least one operation center processing system including a delay associated with the at least one proposed alternative plan of travel.

Example 15 includes the program product of any of Examples 9-14, wherein the program instructions further cause the at least one processor to: receive data about at least one constraint about at least one geographic region and/or location; receive one or more navigation parameters of the vehicle; and generate a current travel path of the vehicle based on the at least one constraint, the one or more navigation parameters of the vehicle; and the data of at least one geographic region of at least one of GNSS spoofing and GNSS jamming.

Example 16 includes a system comprising: a Global Navigation Satellite System (GNSS) receiver configured to determine a position of a vehicle in a geographic region; and processor circuitry coupled to the GNSS receiver, wherein the processor circuitry is configured to: determine whether the position of the vehicle determined by the GNSS receiver is caused by at least one of GNSS spoofing and GNSS jamming; determining that the position of the vehicle determined by the GNSS receiver is caused by at least one of GNSS spoofing and GNSS jamming, then determining at least one proposed alternative plan of travel of the vehicle, wherein at least one of the at least one proposed alternative plan of travel includes a plan of travel that does not intersect at least one geographic region of the at least one geographic region of at least one of GNSS spoofing and GNSS jamming.

Example 17 includes the system of Example 16, further comprising an avionics device coupled to the processor circuitry, wherein the avionics device includes a display and a human-machine interface, wherein the avionics device is configured to present, on the display, a map including at least one geographic region of at least one of GNSS spoofing and GNSS jamming and the at least one proposed alternative plan of travel of the vehicle; receive, on the human-machine interface, a selection of one of the at least one proposed alternative plan of travel of the vehicle; wherein the processor circuitry is configured to determine a path of travel based on the selection of one of the at least one proposed alternative plan of travel and to change a current path of travel of the vehicle to the determined path of travel of the vehicle.

Example 18 includes the system of any of Examples 16-17, wherein the processor circuitry is configured to send the at least one proposed alternative plan of travel of the vehicle to at least one operation center processing system.

Example 19 includes the system of any of Examples 16-18, further comprising an inertial navigation system coupled to the processor circuitry, wherein the processor circuitry is configured to determine that the vehicle passes through at least one geographic region of at least one of GNSS spoofing and GNSS jamming in a current path of travel of the vehicle, and to switch to the inertial navigation system as a primary position determining system upon entering each of the at least one geographic region of at least one of GNSS spoofing and GNSS jamming associated with the at least one proposed alternative plan of travel.

Example 20 includes the system of any of Examples 16-19, wherein the processor circuitry is configured to determine that the vehicle bypasses at least one geographic region of at least one of GNSS spoofing and GNSS jamming in a current path of travel of the vehicle; and to send a message to at least one operation center processing system including a delay associated with the at least one proposed alternative plan of travel.

The terms "about" or "substantially" mean that the value or parameter specified may be somewhat altered, as long as the alteration does not result in nonconformance of the process or structure to the illustrated embodiment from the perspective of one having ordinary skill in the art. The term "exemplary" merely indicates the accompanying description is used as an example, rather than implying an ideal, essential, or preferable feature of the invention.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of providing at least one proposed alternative plan of travel of a navigation vehicle, the method comprising:
   receiving data of at least one geographic region;
   processing the received data to determine that at least one of Global Navigation Satellite System (GNSS) spoofing and jamming is present in the at least one geographical region;
   based upon the data of the at least one geographic region of the at least one of GNSS spoofing and GNSS jamming, determining if a current path of travel of the navigation vehicle intersects the at least one geographic region of the at least one of GNSS spoofing and GNSS jamming;
   determining that the current path of travel of the navigation vehicle intersects the at least one geographic region of the at least one of GNSS spoofing and GNSS jamming, then determining the at least one proposed alternative plan of travel of the navigation vehicle, wherein at least one of the at least one proposed alternative plan of travel includes a path of travel that does not intersect at least one geographic region of the at least one geographic region of the at least one of GNSS spoofing and GNSS jamming; and
   sending, to the navigation vehicle, the determined at least one proposed alternative plan of travel of the navigation vehicle, wherein the at least one proposed alternative plan of travel is executed by the navigation vehicle.

2. The method of claim 1, further comprising:
   presenting, to a crew of the navigation vehicle, the at least one proposed alternative plan of travel of the navigation vehicle;
   receiving, from the crew, a selection of one of the at least one proposed alternative plan of travel of the navigation vehicle;
   determining a path of travel based on the selection of one of the at least one proposed alternative plan of travel; and
   changing the current path of travel of the navigation vehicle to the determined path of travel of the navigation vehicle.

3. The method of claim 1, further comprising sending the determined at least one proposed alternative plan of travel of the navigation vehicle to at least one operation center processing system.

4. The method of claim 1, wherein determining if a current path of travel of the navigation vehicle intersects the at least one geographic region of the at least one of GNSS spoofing and GNSS jamming comprises accessing data stored in a database, the database including data on the at least one geographic region of the at least one of GNSS spoofing and GNSS jamming.

5. The method of claim 1, wherein at least one of the at least one proposed alternative plan of travel includes a path of travel that does not intersect any geographic region of the at least one geographic region of the at least one of GNSS spoofing and GNSS jamming.

6. The method of claim 1, wherein determining at least one proposed alternative plan of travel further comprises:
   determining that the navigation vehicle bypasses the at least one geographic region of the at least one of GNSS spoofing and GNSS jamming in the current path of travel of the navigation vehicle; and sending a message to at least one operation center processing system including a delay associated with the at least one proposed alternative plan of travel.

7. The method of claim 1, wherein determining at least one proposed alternative plan of travel further comprises:
determining that the navigation vehicle passes through the at least one geographic region of the at least one of GNSS spoofing and GNSS jamming in the current path of travel of the navigation vehicle; and
switching to one or more position determining systems upon entering each of the at least one geographic region of the at least one of GNSS spoofing and GNSS jamming associated with the at least one proposed alternative plan of travel.

8. The method of claim 1, further comprising:
receiving data about at least one constraint about the at least one geographic region and/or location;
receiving one or more navigation parameters of the navigation vehicle; and
generating a current travel path of the navigation vehicle based on the at least one constraint, the one or more navigation parameters of the navigation vehicle; and the data of at least one geographic region of the at least one of GNSS spoofing and GNSS jamming.

9. A non-transitory processor-readable medium on which program instructions, configured to be executed by at least one processor, are embodied, wherein when executed the program instructions cause the at least one processor to:
receive data of at least one geographic region;
process the received data to determine that at least one of Global Navigation Satellite System (GNSS) spoofing and jamming is present in the at least one geographical region;
based upon the data of the at least one geographic region of the at least one of GNSS spoofing and GNSS jamming received from the at least one sensor, determine if a current path of travel of a navigation vehicle intersects the at least one geographic region of the at least one of GNSS spoofing and GNSS jamming;
determining that the current path of travel of the navigation vehicle intersects the at least one geographic region of the at least one of GNSS spoofing and GNSS jamming, then determine at least one proposed alternative plan of travel of the navigation vehicle, wherein at least one of the at least one proposed alternative plan of travel includes a path of travel that does not intersect at least one geographic region of the at least one geographic region of the at least one of GNSS spoofing and GNSS jamming; and
send, to the navigation vehicle, the determined at least one proposed alternative plan of travel of the vehicle.

10. The non-transitory processor-readable medium of claim 9, wherein the program instructions further cause the at least one processor to:
present, to a crew of the navigation vehicle, the at least one proposed alternative plan of travel of the navigation vehicle;
receive, from the crew, a selection of one of the at least one proposed alternative plan of travel of the navigation vehicle;
determine a path of travel based on the selection of one of the at least one proposed alternative plan of travel; and
change the current path of travel of the navigation vehicle to the determined path of travel of the navigation vehicle.

11. The program product non-transitory processor-readable medium of claim 9, wherein the program instructions further cause the at least one processor to send the determined at least one proposed alternative plan of travel of the navigation vehicle to at least one operation center processing system.

12. The non-transitory processor-readable medium of claim 9, wherein determine if a current path of travel of the navigation vehicle intersects the at least one geographic region of the at least one of GNSS spoofing and GNSS jamming comprises accessing data stored in a database, the database including data on the at least one geographic region of the at least one of GNSS spoofing and GNSS jamming.

13. The non-transitory processor-readable medium of claim 9, wherein at least one of the at least one proposed alternative plan of travel includes a path of travel that does not intersect any geographic region of the at least one geographic region of the at least one of GNSS spoofing and GNSS jamming.

14. The non-transitory processor-readable medium of claim 9, wherein the program instructions further cause the at least one processor to:
determine that the navigation vehicle bypasses the at least one geographic region of the at least one of GNSS spoofing and GNSS jamming in the current path of travel of the navigation vehicle; and
send a message to at least one operation center processing system including a delay associated with the at least one proposed alternative plan of travel.

15. The non-transitory processor-readable medium of claim 9, wherein the program instructions further cause the at least one processor to:
receive data about at least one constraint about the at least one geographic region and/or location;
receive one or more navigation parameters of the navigation vehicle; and
generate a current travel path of the navigation vehicle based on the at least one constraint, the one or more navigation parameters of the navigation vehicle; and the data of the at least one geographic region of the at least one of GNSS spoofing and GNSS jamming.

* * * * *